' US011122142B2

(12) United States Patent
Shao et al.

(10) Patent No.: US 11,122,142 B2
(45) Date of Patent: Sep. 14, 2021

(54) USER BEHAVIOR DATA PROCESSING METHOD AND DEVICE, AND COMPUTER-READABLE STORAGE MEDIUM

(71) Applicant: Ping An Technology (Shenzhen) Co., Ltd., Guangdong (CN)

(72) Inventors: Leifeng Shao, Guangdong (CN); Feng Gu, Guangdong (CN); Hongyan Wang, Guangdong (CN); Dong Yang, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 448 days.

(21) Appl. No.: 16/305,391

(22) PCT Filed: Sep. 28, 2017

(86) PCT No.: PCT/CN2017/104101
§ 371 (c)(1),
(2) Date: Nov. 29, 2018

(87) PCT Pub. No.: WO2019/019351
PCT Pub. Date: Jan. 31, 2019

(65) Prior Publication Data
US 2020/0244759 A1    Jul. 30, 2020

(30) Foreign Application Priority Data
Jul. 28, 2017  (CN) .......................... 201710636447.1

(51) Int. Cl.
*H04L 29/08*  (2006.01)
*G06F 16/25*  (2019.01)

(52) U.S. Cl.
CPC ............ *H04L 67/306* (2013.01); *G06F 16/25* (2019.01); *H04L 67/22* (2013.01)

(58) Field of Classification Search
None
See application file for complete search history.

(56) References Cited

U.S. PATENT DOCUMENTS

| 6,029,123    | A  | * | 2/2000 | Suda     | G06F 40/279 |
|              |    |   |        |          | 704/9       |
| 2006/0075308 | A1 | * | 4/2006 | Haselden | G06F 11/3476|
|              |    |   |        |          | 714/39      |

(Continued)

FOREIGN PATENT DOCUMENTS

| CN | 101272276 A | 9/2008 |
| CN | 102946319 A | 2/2013 |

(Continued)

*Primary Examiner* — Richard L Bowen

(57) ABSTRACT

Disclosed are a method and a user behavior data processing device, as well as a computer-readable storage medium. The user behavior data processing method includes: obtaining log information stored in a preset server at a fixed time, wherein, the log information comprises user behavior data which is captured and sent to the preset server by client; determining that whether row data satisfying a preset format exists in each row data of the log information, wherein, the row data is the data corresponding to each row of the log information; setting the row data satisfying the preset format as user behavior information; performing data statistics on the user behavior information according to a preset rule to obtain statistical information of the user behavior information.

6 Claims, 4 Drawing Sheets

(56) References Cited

U.S. PATENT DOCUMENTS

| | | | |
|---|---|---|---|
| 2006/0229931 A1* | 10/2006 | Fligler | G06Q 30/02 |
| | | | 705/7.38 |
| 2008/0059474 A1* | 3/2008 | Lim | G06F 21/316 |
| 2012/0221715 A1* | 8/2012 | Hamada | H04L 67/22 |
| | | | 709/224 |
| 2019/0026163 A1* | 1/2019 | Subbiah | G06F 9/542 |

FOREIGN PATENT DOCUMENTS

| | | |
|---|---|---|
| CN | 103166827 A | 6/2013 |
| CN | 103309884 A | 9/2013 |
| CN | 104951517 A | 9/2015 |
| CN | 106940679 A | 7/2017 |
| CN | 107577706 A | 1/2018 |

\* cited by examiner

USER BEHAVIOR DATA PROCESSING METHOD AND DEVICE, AND COMPUTER-READABLE STORAGE MEDIUM

CROSS-REFERENCE TO RELATED APPLICATIONS

The present application claims priority to is the National Stage of International Application No. PCT/CN2017/104101, filed on Sep. 28, 2017, which claims the benefit of Chinese Patent Application No. 201710636447.1, filed on Jul. 28, 2017 with the State Intellectual Property Office and entitled "User Behavior Data Processing Method, Device, and Computer-readable Storage Medium", the entirety of which is hereby incorporated herein by reference.

FIELD

The present disclosure relates to the field of data processing, and more particularly relates to a user behavior data processing method and a user behavior data processing device, as well as a computer-readable storage medium.

BACKGROUND

With the on-going increasing of internet users, user behavior analysis has become one of the important analysis methods in the internet field. Recording and analysis of the users' operation behavior are crucial to the development of product.

Currently, the analysis of user behavior is carried out as follows: the client-side captures data and uploads the captured data to a WEB server in real time; when the WEB server receives the data uploaded by the client-side, the WEB server uploads the data to a database server; when the database server receives the data uploaded by the WEB server, the database server processes the received data and analyzes the user behavior based on the data.

However, for the database server needs to process the received data in real time, as a result, the database server needs to process data for lots of times, which would cause a high processing pressure of the database server and a low data processing efficiency.

SUMMARY

It is one main object of the present disclosure to provide a user behavior data processing method and a user behavior data processing device, as well as a computer-readable storage medium, aiming to solve the technical problem in the prior art that the database server works under a high processing pressure and has a low processing efficiency during analysis of the user behavior.

In order to realize the above aim, the present disclosure provides a user behavior data processing method, the method includes the following steps:

obtaining log information stored in a preset server at a fixed time, wherein, the log information includes user behavior data which is captured and sent to the preset server by client;

determining that whether row data satisfying a preset format exists in each row data of the log information, wherein, the row data is the data corresponding to each row of the log information;

setting the row data satisfying the preset format as user behavior information;

performing data statistics on the user behavior information according to a preset rule to obtain statistical information of the user behavior information.

In an exemplary embodiment, the step of setting the row data satisfying the preset format as user behavior information includes:

determining that whether the row data satisfying the preset format comprises row data satisfying a preset permission;

setting the row data satisfying the preset permission as user behavior information, when the row data satisfying the preset format includes row data satisfying a preset permission.

In an exemplary embodiment, the step of determining that whether the row data satisfying the preset format includes row data satisfying a preset permission includes:

obtaining row data comprising a preset character or a preset character string from the row data satisfying the preset format;

performing permission validation on the first word after the preset character or the preset character string in the row data comprising the preset character or the preset character string, to obtain the verified row data, and setting the verified row data as the row data satisfying the preset permission.

In an exemplary embodiment, the step of setting the row data satisfying the preset format as user behavior information includes:

obtaining row data comprising a preset character or a preset character string from the row data satisfying the preset format;

determining that in the row data comprising the preset character or preset character string, whether exists row data that the second word after the preset character or the preset character string is a preset information;

setting the row data that the second word after the preset character or the preset character string is the preset information as user behavior information.

In an exemplary embodiment, the step of setting the row data satisfying the preset format as user behavior information includes:

obtaining row data comprising a preset character or a preset character string from the row data satisfying the preset format;

determining that in the row data comprising the preset character or preset character string, whether exists row data that the number of words after the preset character or the preset character string is less than a preset threshold;

setting the row data that the number of words after the preset character or the preset character string is less than the preset threshold as user behavior information.

In an exemplary embodiment, the step of performing data statistics on the user behavior information according to a preset rule to obtain statistical information of the user behavior information includes:

loading the user behavior information into a database table;

based on the database table, performing data statistics on the user behavior information according to a preset rule, to obtain statistical information of the user behavior information.

In an exemplary embodiment, after the step of performing data statistics on the user behavior information according to a preset rule, the user behavior data processing method further includes:

obtaining attribute information of the user behavior information;

displaying the attribute information and the statistical information.

In addition, in order to realize the above aim, the present disclosure also provides a user behavior data processing device. The user behavior data processing device includes: a memory, a processor and a user behavior data processing program which stored in the memory and executable by the processor, the user behavior data processing program when being executed by the processor performing steps of the user behavior data processing method.

In addition, in order to realize the above aim, the present disclosure also provides a computer-readable storage medium. The computer-readable storage medium stores a user behavior data processing program when being executed by the processor performing steps of the user behavior data processing method.

In accordance with the present disclosure, log information stored in a preset sever is obtained at a fixed time, wherein, the log information includes user behavior data which is captured and sent to the preset server by client. Next, whether row data satisfying a preset format exists in each row data of the log information is determined, wherein, the row data is the data corresponding to each row of the log information. Then, the row data satisfying the preset format is set as user behavior information. Finally, data statistics is performed on the user behavior information according to a preset rule to obtain statistical information of the user behavior information. Obtaining log information at a fixed time by a HADOOP large data platform avoids the real-time data processing of the HADOOP large data platform, and reduces the amount of processing as well as in turn reduces the operating pressure of the HADOOP large data platform. At the same time, the cleaning operations for the log information by the HADOOP large data platform reduces the amount of data processing and improves data processing efficiency of the HADOOP large data platform.

The realizing of the aim, functional characteristics and advantages of the present disclosure are further described in detail with reference to the accompanying drawings and the embodiments.

DETAILED DESCRIPTION OF THE EMBODIMENTS

It will be appreciated that the specific embodiments described herein are merely illustrative of the present disclosure and are not intended to limit the present disclosure.

Figure 1:
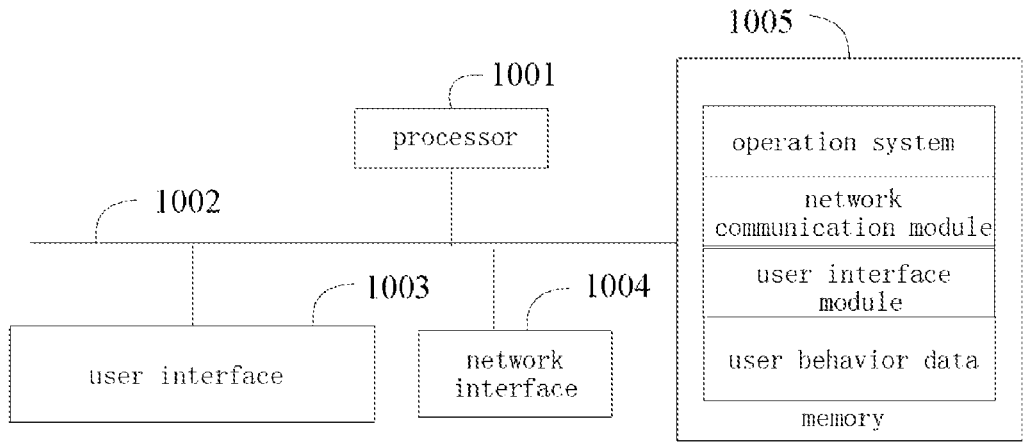
FIG. 1 is an schematic diagram of a terminal to which a user behavior data processing device belongs in a hardware operating environment according to an embodiment of this disclosure.

FIG. 1 is an schematic diagram of a terminal to which a user behavior data processing device belongs in a hardware operating environment according to an embodiment of this disclosure.

The terminal in the embodiment of the present disclosure may be a personal computer (PC), or may be a mobile terminal device having a display function, such as a smart phone, a tablet computer, an e-book reader, an MP3 (Moving Picture Experts Group Audio Layer III) player, an MP4 (Moving Picture Experts Group Audio Layer IV) player, a portable computer, and so on.

As illustrated in FIG. 1, the terminal may include: a processor 1001, such as CPU, a network interface 1004, a user interface 1003, a memory 1005, and a communication bus 1002. The communication bus 1002 is configured to facilitate connection and communication between these components. The user interface 1003 may include a display, an input unit such as a keyboard, and an optional user interface 1003 may also include a standard wired interface and wireless interface. The network interface 1004 may optionally include a standard wired interface, and a wireless interface (such as a WI-FI interface). The memory 1005 may be a high-speed RAM memory, or a non-volatile memory such as a disk memory. The memory 1005 optionally may also be a storage device that is separate from the processor 1001 described above.

Alternatively, the terminal may also include a camera, a RF (Radio Frequency) circuitry, a sensor, an audio circuitry, a WiFi module, and the like. The sensor is such as a light sensor, a motion sensor or other sensor. Specifically, the light sensor may include an ambient light sensor and a proximity sensor, wherein, the ambient light sensor can adjust the brightness of the display according to the light of the ambient light, and the proximity sensor can turn off the display and/or the backlight when the mobile terminal moves to the ear. As one kind of the motion sensor, a gravity acceleration sensor can detect the magnitude of acceleration in each direction (usually three axes), and can detect the magnitude and direction of gravity when stationary, as well as can be used to identify the posture of the mobile terminal (such as horizontal and vertical screen switching, related games, magnetometer attitude calibration), vibration recognition related functions (such as pedometer, tapping), and so on. Of course, the mobile terminal can also be equipped with other sensors such as a gyroscope, a barometer, a hygrometer, a thermometer, an infrared sensor, and the like. Thus, they are not to be detailed herein again.

Those skilled in the art can understand that the structure of the terminal illustrated in FIG. 1 does not constitute a limitation on the terminal. Thus, the terminal may include more or less components than those illustrated, or some components to be combined, or different arrangements of components.

As illustrated in FIG. 1, the memory 1005 as a computer storage medium may include an operation system, a network communication module, a user interface module and a user behavior data processing program.

In the terminal illustrated in FIG. 1, the network interface 1004 is mainly configured to connect a background server and communicate data with the background server; the user interface 1003 is mainly configured to connect the client (user side) and communicate data with the client; and the processor 1001 may be configured to execute the user behavior data processing program stored in the memory 1005.

In the exemplary embodiment, the user behavior data processing device includes: a memory 1005, a processor 1001 and a user behavior data processing program stored in the memory 1005 and executable by the processor 1001, wherein, the processor 1001 is configured to execute the user behavior data processing program to perform the following steps:

obtaining log information stored in a preset server at a fixed time, wherein, the log information includes user behavior data which is captured and sent to the preset server by client;

determining that whether row data satisfying a preset format exists in each row data of the log information, wherein, the row data is the data corresponding to each row of the log information;

setting the row data satisfying the preset format as user behavior information;

performing data statistics on the user behavior information according to a preset rule to obtain statistical information of the user behavior information.

Further, the processor 1001 is configured to be able to execute the user behavior data processing program stored in the memory 1005 to further perform the following steps:

determining that whether the row data satisfying the preset format includes row data satisfying a preset permission;

setting the row data satisfying the preset permission as user behavior information.

Further, the processor 1001 is configured to be able to execute the user behavior data processing program stored in the memory 1005 to further perform the following steps:

obtaining row data comprising a preset character or a preset character string from the row data satisfying the preset format;

performing permission validation on the first word after the preset character or the preset character string in the row data comprising the preset character or the preset character string, to obtain the verified row data, and setting the verified row data as the row data satisfying the preset permission.

Further, the processor 1001 is configured to be able to execute the user behavior data processing program stored in the memory 1005 to further perform the following steps:

obtaining row data comprising a preset character or a preset character string from the row data satisfying the preset format;

determining that in the row data comprising the preset character or preset character string, whether exists row data that the second word after the preset character or the preset character string is a preset information;

setting the row data that the second word after the preset character or the preset character string is the preset information as user behavior information.

Further, the processor 1001 is configured to be able to execute the user behavior data processing program stored in the memory 1005 to further perform the following steps:

obtaining row data comprising a preset character or a preset character string from the row data satisfying the preset format;

determining that in the row data comprising the preset character or preset character string, whether exists row data that the number of words after the preset character or the preset character string is less than a preset threshold;

setting the row data that the number of words after the preset character or the preset character string is less than the preset threshold as user behavior information.

Further, the processor 1001 is configured to be able to execute the user behavior data processing program stored in the memory 1005 to further perform the following steps:

loading the user behavior information into a database table;

based on the database table, performing data statistics on the user behavior information according to a preset rule, to obtain statistical information of the user behavior information.

Further, the processor 1001 is configured to be able to execute the user behavior data processing program stored in the memory 1005 to further perform the following steps:

obtaining attribute information of the user behavior information;

displaying the attribute information and the statistical information.

Figure 2:
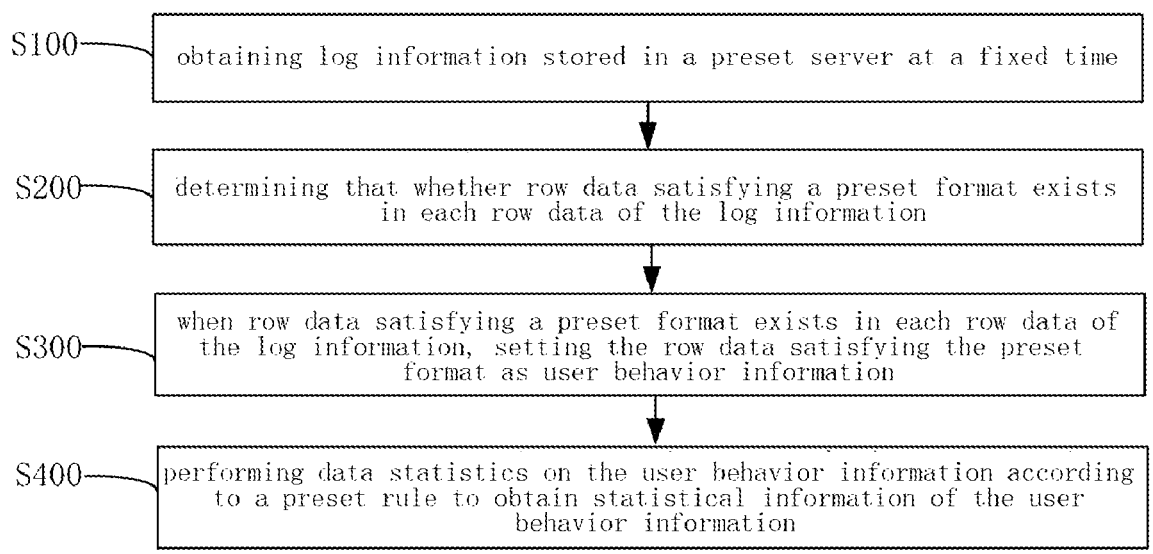
FIG. 2 is an illustrative flowchart of a first embodiment of a user behavior data processing method according to this disclosure.

The present disclosure further provides a user behavior data processing method. Referring to FIG. 2, FIG. 2 is an illustrative flowchart of a first embodiment of a user behavior data processing method according to this disclosure.

In the exemplary embodiment, the user behavior data processing method includes:

S100, obtaining log information stored in a preset server at a fixed time, wherein, the log information includes user behavior data which is captured and sent to the preset server by client;

The preset server includes a file server, an application server, a WEB server and the like. Specifically, the file server is configured to have functions of such as storing files, providing file browsing to other servers or clients and so on; the application server is configured to provide background support service of applications for corresponding clients; the WEB server is configured to provide background support service of web pages for corresponding clients. The user behavior data processing method in the exemplary embodiment can be applied to a distributed database table infrastructure platform, namely a HADOOP large data platform.

In the exemplary embodiment, in order to obtain user behavior data, a capture script of user behavior data can be embedded in a file, an application, or a web page provided by the preset server. Take the web page as an example, when the client displays a preset web page corresponding to the WEB server, the client executes the capture script of user behavior data embedded in the preset web page and sends the user behavior data captured to the preset server, then the preset server stores the user behavior data obtained in log information, finally the HADOOP large data platform obtains the log information stored in the preset server at a fixed time. The user behavior data captured includes: user input data captured, data corresponding to the cursor staying time exceeding a certain time, and data corresponding to a user clicking an interface button and so on. When the user behavior data above is stored in the preset server, the start and end identifiers of each set of the user behavior data are in the same row.

For example, when the needed data is the data corresponding to a user clicking an interface button, a capture script of the data corresponding to the user clicking the interface button can be embedded in the preset server. The client executes the capture script of the data corresponding to the user clicking the interface button which is embedded in the preset server, and sends the captured data corresponding to the user clicking the interface button to the preset server. The preset server stores the obtained data corresponding to the user clicking the interface button in log information.

In the exemplary embodiment, the log information stored in the preset server is obtained at a fixed time directly by the HADOOP large data platform. Preferably, the HADOOP large data platform can obtain the log information stored in the preset server during a preset time period at a fixed time, or obtain the log information stored in the preset server between the previous acquisition time and the current time. For example, if the fixed time to obtain is 8:00 am and the preset time period is one day, then the HADOOP will obtain, at 8:00 am today, the log information stored in the preset server between 8:00 am yesterday and 8:00 am today. The time period to obtain at a fixed time can be reasonably set according to the actual requirements, such as, the time period to be set to 1 hour, 1 day, and the like. Thus, they are not to be detailed herein again.

Preferably, as the current time is the fixed time at which the log information stored in the preset server is to be obtained, a communicating connection between the HADOOP large data platform and the preset server is established, and each time the log information stored in the preset server is successfully obtained, the connection can be disconnected to avoid the communication state when the HADOOP large data platform and the preset server have no data transmission, so as to improve the bandwidth resource utilization rate of the preset server.

S200, determining that whether row data satisfying a preset format exists in each row data of the log information, wherein, the row data is the data corresponding to each row of the log information;

The preset format may be a storage format of the preset server corresponding to the log information of the user information. In the preset server, different log information can be stored in different text formats. User behavior data can be row data starting with the character string dpmp_log:, row data ending with the character string dpmp_log:, row data ending with or beginning with other character or character string, and so on. For example, the preset format to be row data starting with the character string dpmp_log:, when a user clicks an interface of an application, the client captures the user's behavior data according to a customized script and stores the captured behavior data in log information of the preset server. Then the HADOOP large data platform obtains the log information at a fixed time, and in the HADOOP large data platform, whether the log information is the row data satisfying the preset format is determined, namely whether the row data corresponding to the log information is the row data starting with the preset character or the preset character string, namely the row data starting with the character string dpmp_log:. When the row data is satisfied with the start of the character string dpmp_log:, the row data corresponding to the log information is the row data satisfying the preset format.

In other embodiments, it may take various ways to clean the obtained log information in order to get data related to the user behavior in the log information. Fox example, it's first to filter out information satisfying the preset format in the log information obtained in the HADOOP large data platform, then, according to a preset condition, to filter layer by layer in order to obtain information data satisfying the preset condition, wherein the preset condition including limitation requirements such as format, symbol, satisfaction formula, number of words after characters and so on in the information data, finally, through filtering of these preset conditions, to obtain the information data satisfying the condition clearly and quickly. Specifically, it's first to obtain row data satisfying a preset format in each row data of the log information, next to obtain row data satisfying a preset permission in the row data satisfying the preset format, to obtain row data including a preset character or a preset character string from the row data satisfying the preset format, and to perform validation on the first word after the preset character or the preset character string in the row data including the preset character or the preset character string, then to determine whether the second word is operators' information, finally to determine in the row data including the preset character or the preset character string, whether exists row data that the number of words after the preset character or the preset character string is less than a preset threshold. The obtained row data less than the preset threshold is user behavior information. The order of each step in the above cleaning operations can be arbitrarily ordered and combined.

S300, setting the row data satisfying the preset format as user behavior information;

In the exemplary embodiment, when row data satisfying the preset format exists in each row data of the log information, the row data satisfying the preset format is set as user behavior information. User behavior data often involves multiple aspects, and user behavior information is user behavior data of a specific aspect that needs to be analyzed or counted. For example, the preset format starting with the character string dpmp_log:, when a user clicks to access an interface of an application, the client captures the user's behavior data according to a customized script and stores the captured behavior data into log information in the preset server. The HADOOP large data platform obtains the log information at a fixed time, and in the HADOOP large data platform, it's to determine whether row data starting with the character string dpmp_log: exists in the row data corresponding to the log information. When the row data starting with the character string dpmp_log: exists in the row data corresponding to the log information, the row data is set as user behavior information. Setting the row data as user behavior information includes reserving a storage space in the database named user behavior information library, then saving the row data in the user behavior information library, or directly naming the row data satisfying the preset format as user behavior information.

S400, performing data statistics on the user behavior information according to a preset rule to obtain statistical information of the user behavior information.

The data statistics include: statistics on the number of occurrences of a certain fixed information in the data after cleaning, the number of times the function point appears, the data input by the user, the data corresponding to the time when the cursor staying time exceeds a certain time, and the data corresponding to the button of the user clicking the interface. When a user accesses a preset web page, the client runs the capture script of the user behavior data embedded in the preset web page corresponding to the preset server and sends the user behavior data captured to the preset server, and the preset server stores the user behavior data obtained in log information, next the HADOOP large data platform obtains the log information stored in the preset server at a fixed time, then the log information obtained at the fixed time is cleaned, finally statistics and analysis are performed on the user behavior data. For example, log information of user behavior of the investment and finance to be needed, when a user accesses a web page related to the investment and finance, the client captures the access behavior data left in the web page related to the investment and finance according to a customized script, and stores the captured behavior data into log information in the preset server, next the HADOOP large data platform obtains the log information stored in the preset server at a fixed time, then in the HADOOP large data platform, the obtained log information is to be cleaned, finally statistics and analysis are performed on the cleaned log information data. The number of all users accessing the web page can be counted, and the number of users is a manifestation of the number of occurrences of the certain fixed information.

User behavior information is counted according to a certain preset rule. Statistics according to a preset rule can be done according to a statistical identification. For example, it can be counted that the number of times a fixed message appears in the cleaned data or the number of times the function point appears, time sorting of certain data input by users, the specific staying time of data corresponding to cursor staying time exceeds a certain time, and the specific content of data corresponding to a button of a user clicking interface.

In the exemplary embodiment, the purpose of data statistics is to arrange and display the data information obtained after cleaning according to a certain preset rule, therefore it's needed to perform data statistics on the cleaned data. Statistical information refers to information obtained by statistics according to a preset rule and attribute information of the information. In the exemplary embodiment, the statistical information includes: number of users, page views, APP user registrations and rankings, and so on, the attribute information includes: information name, page URL, time, information category, and so on.

In accordance with the user behavior data processing method proposed in this disclosure, it's first to obtain log information stored in a preset sever at a fixed time, wherein, the log information includes user behavior data which is captured and sent to the preset server by client; next, to determine whether row data satisfying a preset format exists in each row data of the log information, wherein, the row data is the data corresponding to each row of the log information; then to set the row data satisfying the preset format as user behavior information; finally, to perform data statistics on the user behavior information according to a preset rule to obtain statistical information of the user behavior information. Obtaining log information at a fixed time by a HADOOP large data platform avoids the real-time data processing of the HADOOP large data platform, and reduces the number of processing as well as in turn reduces the operating pressure of the HADOOP data large platform. At the same time, the cleaning operation for the log information by the HADOOP data large platform reduces the amount of data processing and improves data processing efficiency of the HADOOP data platform.

Figure 3:
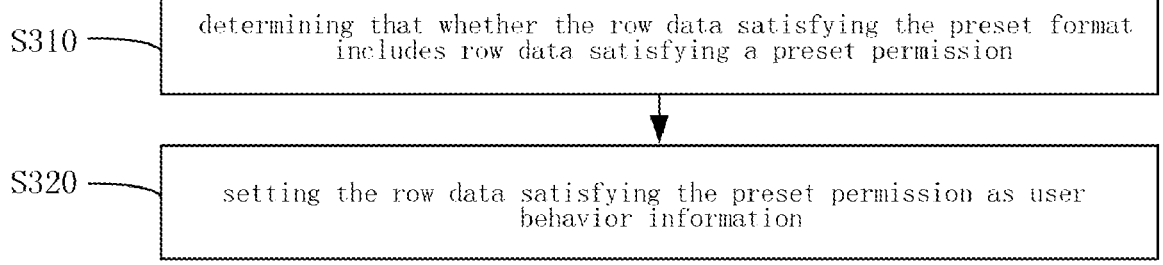
FIG. 3 is a detailed illustrative flowchart of the step of setting the row data satisfying the preset format as user behavior information in a second embodiment of a user behavior data processing method according to this disclosure.

Based on the first embodiment, a second embodiment of the user behavior data processing method in accordance with this disclosure is provided. Referring to FIG. 3, the step S300 includes:

S310, determining that whether the row data satisfying the preset format includes row data satisfying a preset permission;

In the exemplary embodiment, determining whether the row data satisfying the preset format includes row data satisfying a preset permission refers to the row data satisfying the preset format includes permission information corresponding to the preset permission. For example, when the permission information corresponding to the preset permission includes multiple information (such as character strings), as long as the row data satisfying the preset format includes one character string of the permission information, it can be determined that the row data satisfies the preset permission, that is to say, the row data satisfying the preset format includes row data satisfying the preset permission.

For example, the log information is the page views of users of the financial investment in 2016. Row data corresponding to the log information includes different manifestation forms of data information such as the storage format of the web browsing record, the fixed storage characters of the financial investment, or the numbers corresponding to the browsing time and so on. Format requirements, character requirements, numerical requirements or formulas and the like are set according to the manifestation form of the corresponding data information required, namely, the permission information is set. In accordance with the permission information, row data including the preset permission information corresponding to the preset permission is filtered out and the row data satisfying the preset permission is obtained.

S320, setting the row data satisfying the preset permission as user behavior information.

In the exemplary embodiment, it's first to determine whether the row data satisfying the preset format includes row data satisfying a preset permission, then to set the row data satisfying the preset permission as user behavior information.

In accordance with the user behavior data processing method proposed in the exemplary embodiment, it's first to determine whether the row data satisfying the preset format includes row data satisfying a preset permission, then to set the row data satisfying the preset permission as user behavior information. These make it possible to filter out the log information corresponding to user behavior in the row data satisfying the preset format according to a preset permission accurately and quickly. Further filtering of the log information avoids analyzing and processing the data in the log information that is not related to the user behavior, thereby further reducing the amount of data for user behavior analysis and improving the processing efficiency of the HADOOP.

Figure 4:
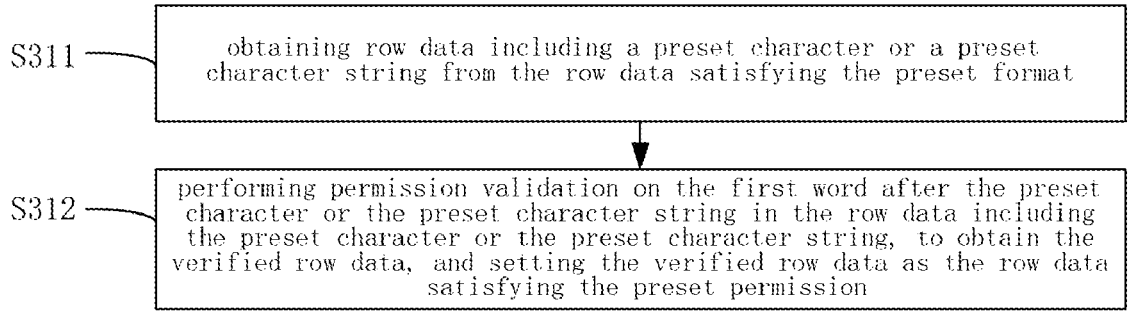
FIG. 4 is a detailed illustrative flowchart of the step of determining that whether the row data satisfying the preset format includes row data satisfying a preset permission in a third embodiment of a user behavior data processing method according to this disclosure.

Based on the second embodiment, a third embodiment of the user behavior data processing method in accordance with this disclosure is provided. Referring to FIG. 4, in the exemplary embodiment, the step S310 includes:

S311, obtaining row data including a preset character or a preset character string from the row data satisfying the preset format;

In the exemplary embodiment, the preset character or the preset character string includes words, letters, numbers, symbols, and so on. For example, the preset character includes α, % and the like, the preset character string includes $$, mm and the like. The row data corresponding to log information of different kinds includes different characters or character strings generally, therefore the corresponding row data may include multiple characters or character strings, or a combination of characters and character strings. For example, when the preset character is α and the row data satisfying the preset format includes α, the corresponding row data meets the requirement of the preset character; or, when the preset character string is $$ and the row data satisfying the preset format includes $$, the corresponding row data meets the requirement of the preset character string; or, when the preset character is α, the preset character string is $$ and the row data satisfying the preset format includes both α and $$, the corresponding row data meets the requirements of the preset character and the preset character string.

S312, performing permission validation on the first word after the preset character or the preset character string in the row data including the preset character or the preset character string, to obtain the verified row data, and setting the verified row data as the row data satisfying the preset permission.

In the exemplary embodiment, it's first to obtain row data corresponding to the log information including a preset format, next to filter out row data including a preset character or a preset character string in the log information, then to perform permission validation on the first word after the preset character or the preset character string, such as when the preset character string is $$, it's to determine whether the first word after $$ in the row data satisfying the preset format is consistent with a permission information, finally to filter out row data that the first word after $$ is consistent with the permission information. Of course, satisfying permission can be the word at a different position such as at the first, the second, the third and so on after or before $$, it can also be the word at a different position, such as at the first, the second, the third and so on after or before different characters such as symbols, numbers and so on or character strings.

In accordance with the user behavior data processing method proposed in the exemplary embodiment, it's first to obtain row data including a preset character or a preset character string in the row data satisfying the preset format, next to perform permission validation on the first word after the preset character or the preset character string in the row data including the preset character or the preset character string in order to obtain the verified row data, and finally to set the verified row data as the row data satisfying the preset permission. The permission validation on the row data satisfying the preset format makes it possible to filter out the log information corresponding to the user behavior accurately and quickly. The further filtering of the log information avoids analyzing and processing the data in the log information that is not related to the user behavior, thereby further reducing the amount of data for user behavior analysis and improving the processing efficiency of the HADOOP.

Figure 5:
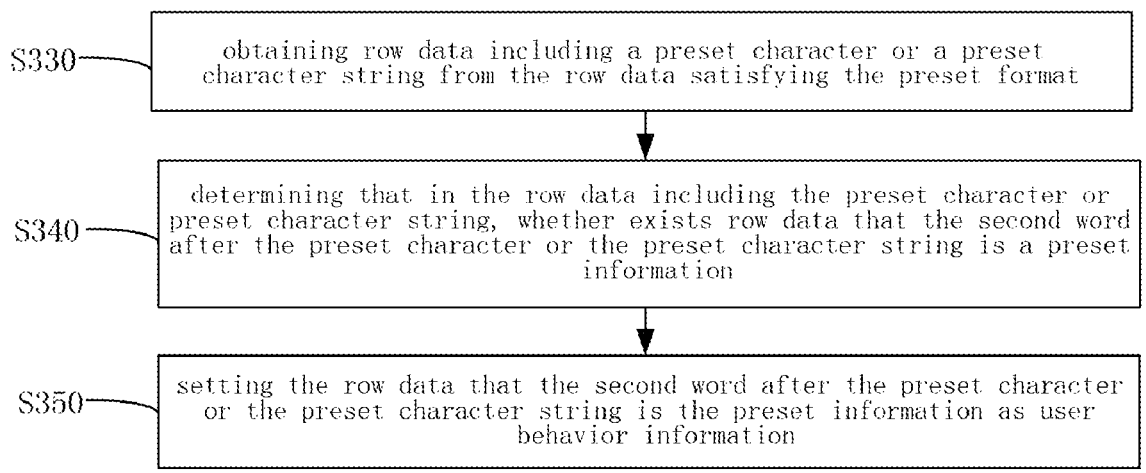
FIG. 5 is a detailed illustrative flowchart of the step of setting the row data satisfying the preset format as user behavior information in a fourth embodiment of a user behavior data processing method according to this disclosure.

Based on the first embodiment, a fourth embodiment of the user behavior data processing method in accordance with this disclosure is provided. Referring to FIG. 5, the step S300 further includes:

S330, obtaining row data including a preset character or a preset character string from the row data satisfying the preset format;

In the exemplary embodiment, the preset character or the preset character string includes words, letters, numbers, symbols, and so on. For example, the preset character includes α, % and the like, the preset character string includes $$, mm and the like. The row data corresponding to log information of different kinds includes different characters or character strings generally, therefore the corresponding row data may include multiple characters or character strings, or a combination of characters and character strings. For example, when the preset character is α and the row data satisfying the preset format includes α, the corresponding row data meets the requirement of the preset character; or, when the preset character string is $$ and the row data satisfying the preset format includes $$, the corresponding row data meets the requirement of the preset character string; or, when the preset character is α, the preset character string is $$ and the row data satisfying the preset format includes both α and $$, the corresponding row data meets the requirements of the preset character and the preset character string.

S340, determining that in the row data including the preset character or preset character string, whether exists row data that the second word after the preset character or the preset character string is a preset information;

In the exemplary embodiment, it's first to filter out row data including a preset character or a preset character string, then to determine whether the second word after the preset character or the preset character string in the row data corresponding to the log information is a preset information, or the third word or the word at another position after or before the preset character or the preset character string. The position of the word is not limited in the exemplary embodiment.

The preset information can be reasonably set in accordance with the storage format of user behavior data. For example, the preset information can be information of operators. It this is the case, it's to determine that in the row data including the preset character or preset character string, whether exists row data that the second word after the preset character or the preset character string is the information of operators. For example, when the preset character string is $$, it's to determine whether the second word after $$ in the log file row is the information of operators. Specifically, regular expression: ^[\w\d_-\+\.]*$ can be used to determine whether the second word after $$ is the information of operators. When in the row data including the preset character or the preset character string, row data satisfying the regular expression exists, it's to determine that in the row data including the preset character or the preset character string, row data that the second word after the preset character or the preset character string is the preset information exists.

S350, setting the row data that the second word after the preset character or the preset character string is the preset information as user behavior information.

In the exemplary embodiment, it's to determine whether the second word after the preset character or the preset character string in the row data is a preset information exists. If the second word after the preset character or the preset character string in the row data is the preset information exists, the row data is set as user behavior information.

In accordance with the user behavior data processing method proposed in the exemplary embodiment, it's first to obtain row data including a preset character or a preset character string in the row data satisfying the preset format, then to determine that in the row data including the preset character or preset character string, whether exists row data that the second word after the preset character or the preset character string is a preset information, finally to set the row data that the second word after the preset character or the preset character string is the preset information as user behavior information. The determination that whether the second word after the preset character or the preset character string in the row data satisfying the preset format is the preset information makes it accurate and quick to filter out the log information corresponding to the user behavior. Further filtering of the log information avoids analyzing and processing the data in the log information that is not related to the user behavior, thereby further reducing the amount of data for user behavior analysis and improving the processing efficiency of the HADOOP.

Figure 6:
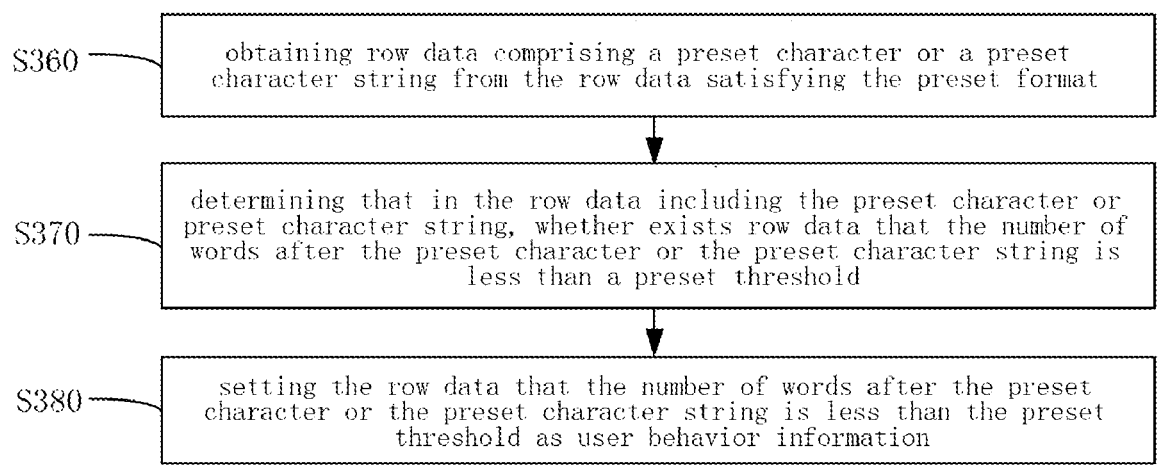
FIG. 6 is a detailed illustrative flowchart of the step of setting the row data satisfying the preset format as user behavior information in a fifth embodiment of a user behavior data processing method according to this disclosure.

Based on the first embodiment, a fifth embodiment of the user behavior data processing method in accordance with this disclosure is provided. Referring to FIG. 6, in the exemplary embodiment, the step S300 further includes:

S360, obtaining row data including a preset character or a preset character string from the row data satisfying the preset format;

In the exemplary embodiment, the preset character or the preset character string includes words, letters, numbers, symbols, and so on. For example, the preset character includes α, % and the like, the preset character string includes $$, mm and the like. The row data corresponding to log information of different kinds includes different characters or character strings generally, therefore the corresponding row data may include multiple characters or character strings, or a combination of characters and character strings. For example, when the preset character is α and the row data satisfying the preset format includes α, the corresponding row data meets the requirement of the preset character; or, when the preset character string is $$ and the row data satisfying the preset format includes $$, the corresponding row data meets the requirement of the preset character string; or, when the preset character is α, the preset character string is $$ and the row data satisfying the preset format includes both α and $$, the corresponding row data meets the requirements of the preset character and the preset character string.

S370, determining that in the row data comprising the preset character or preset character string, whether exists row data that the number of words after the preset character or the preset character string is less than a preset threshold;

In the exemplary embodiment, whether exceeding a preset threshold is determined according to the number of words after the preset character or the preset character string. Therefore, it's first to count the number of words after the preset character or the preset character string in the row data including the preset character or the preset character string, then to compare the number of words to a preset threshold. If the number of words is less than the preset threshold, the row data is filtered to be set as user behavior information. For example, when the preset character string is $$, the row data including $$ is filtered out and the number of words after $$ in the row data is counted. The counted number of words of a row data in the row data including the preset character or the preset character string to be n, the preset threshold to be m, if n<m, then the row data is filtered out to be set as user behavior information.

S380, setting the row data that the number of words after the preset character or the preset character string is less than the preset threshold as user behavior information.

In the exemplary embodiment, if row data that the number of words after the preset character or the preset character string is less than a preset threshold exists in the log information, the row data is set as user behavior information.

In accordance with the user behavior data processing method proposed in the exemplary embodiment, it's first to obtain row data including a preset character or a preset character string in the row data satisfying the preset format, then to determine that in the row data including the preset character or preset character string, whether exists row data that the number of words after the preset character or the preset character string is less than a preset threshold, finally to set the row data that the number of words after the preset character or the preset character string is less than the preset threshold as user behavior information. The determination that whether the number of words after the preset character or the preset character string in the row data satisfying the preset format is less than the preset threshold makes it accurate and quick to filter out the log information corresponding to the user behavior. The further filtering of the log information avoids analyzing and processing the data in the log information that is not related to the user behavior, thereby further reducing the amount of data for user behavior analysis and improving the processing efficiency of the HADOOP.

In other embodiments, the steps of cleaning the obtained log information can be performed in any combination.

For example, it's to determine whether row data satisfying a preset format exists in each row data of the log information, wherein, the row data is the data corresponding to each row of the log information. When the row data satisfying the preset format exists in each row data of the log information, it's to determine whether the row data satisfying the preset format includes row data satisfying a preset permission. When the row data satisfying the preset format includes row data satisfying the preset permission, it's to obtain row data including a preset character or a preset character string from the row data satisfying the preset permission, then to determine in the row data including the preset character or the preset character string, whether exists row data that the second word after the preset character or the preset character string is a preset information. When row data that the second word after the preset character or the preset character string is the preset information exists, it's to obtain row data including the preset character or the preset character string from the row data that the second word after the preset character or the preset character string is the preset information. It's to determine in the row data including the preset character or the preset character string, whether exists row data that the number of words after the preset character or the preset character string is less than a preset threshold. When row data that the number of words after the preset character or the preset character string is less than the preset threshold exists, the row data that the number of words after the preset character or the preset character string is less than the preset threshold is set as user behavior information.

Or, it's to determine whether row data satisfying a preset format exists in each row data of the log information, wherein, the row data is the data corresponding to each row of the log information. When row data satisfying the preset format exists in each row data of the log information, it's to determine whether the row data satisfying the preset format includes row data satisfying a preset permission. When the row data satisfying the preset format includes row data satisfying the preset permission, it's to obtain row data including a preset character or a preset character string from the row data satisfying the preset permission, then to determine in the row data including the preset character or the preset character string, whether exists row data that the second word after the preset character or the preset character string is a preset information. When row data that the second word after the preset character or the preset character string is the preset information exists, the row data that the second word after the preset character or the preset character string is the preset information is set as user behavior information.

Or, it's to determine whether row data satisfying a preset format exists in each row data of the log information, wherein, the row data is the data corresponding to each row of the log information. When row data satisfying the preset format exists in each row data of the log information, it's to determine whether the row data satisfying the preset format includes row data satisfying a preset permission. When the row data satisfying the preset format includes row data satisfying the preset permission, it's to obtain row data including a preset character or a preset character string from the row data satisfying the preset permission, then to determine that in the row data including the preset character or the preset character string, whether exists row data that the number of words after the preset character or the preset character string is less than a preset threshold. When row data that the number of words after the preset character or the preset character string is less than the preset threshold exists, the row data that the number of words after the preset character or the preset character string is less than the preset threshold is set as user behavior information.

Figure 7:
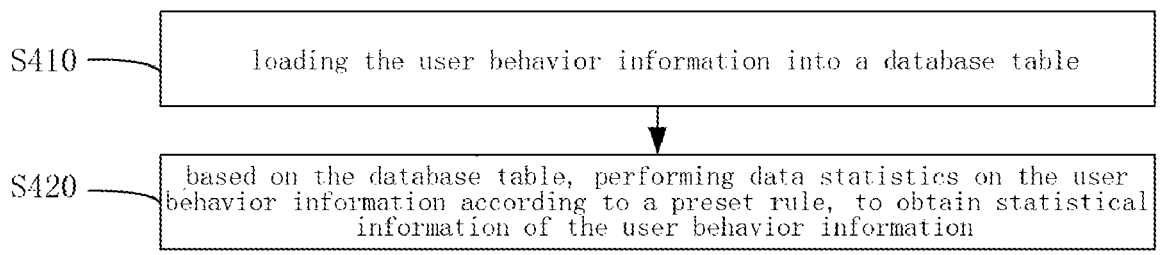
FIG. 7 is a detailed illustrative flowchart of the step of performing data statistics on the user behavior information according to a preset rule to obtain statistical information of the user behavior information in a sixth embodiment of a user behavior data processing method according to this disclosure.

Based on the first embodiment, a sixth embodiment of the user behavior data processing method in accordance with this disclosure is provided. Referring to FIG. 7, in the exemplary embodiment, the step S400 further includes:

S410, loading the user behavior information into a database table;

In the exemplary embodiment, the information data obtained after cleaning can be loaded into a database table, and can be counted according to a preset rule in the database table which may be a newly created database table or a pre-existing database table or a used database table.

S420, based on the database table, performing data statistics on the user behavior information according to a preset rule, to obtain statistical information of the user behavior information.

In the exemplary embodiment, the preset rule refers to statistics based on a certain calculation or a classification, for example, the data obtained after cleaning is the data of access behavior to an APP interface. Based on hive table, it can be counted that the number of times a user clicking on the APP interface, the length of time of access to the APP, or more behavior data characteristics corresponding to the log information. Statistics can be performed according to these different data characteristics in database table, namely, according to the preset rule. Statistical information of the log information can be clearly obtained after statistics, wherein the statistical information includes information obtained by statistics and its corresponding attribute information.

In accordance with the user behavior data processing method proposed in the exemplary embodiment, the user behavior information is loaded into a database table, then based on the database table, data statistics on the user behavior information according to a preset rule is performed to obtain statistical information of the user behavior information. The statistics on the log data can make the statistical information of the log information clear at a glance, which is facilitative for comparison and analysis.

Figure 8:
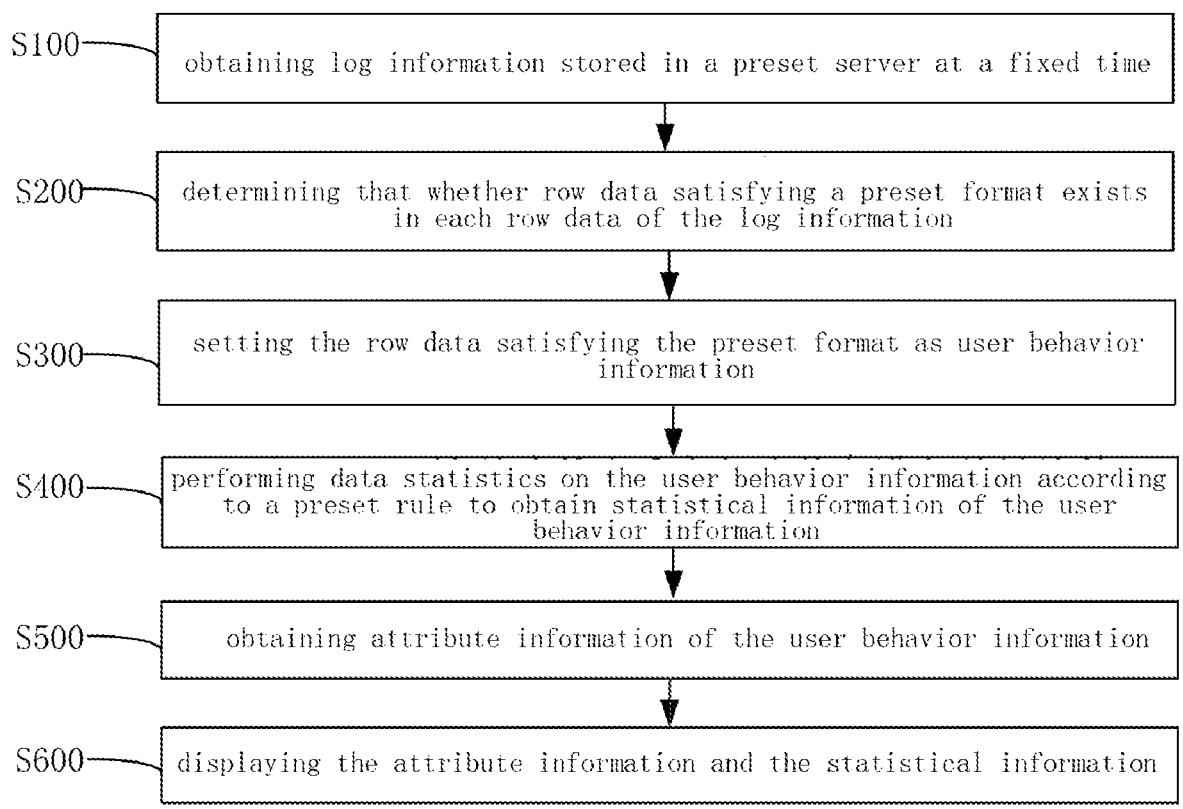
FIG. 8 is an illustrative flowchart of a seventh embodiment of a user behavior data processing method according to this disclosure.

Based on the above-mentioned embodiments, a seventh embodiment of the user behavior data processing method in accordance with this disclosure is provided. Referring to FIG. 8, in the exemplary embodiment, after the step S300, the user behavior data processing method further includes:

S500, obtaining attribute information of the user behavior information;

In the exemplary embodiment, the log information has its corresponding attribute information. The attribute information of the log information obtained after cleaning can be directly obtained on the HADOOP large data platform, wherein the attribute information includes page information URL, information name, time, information type and so on.

S600, displaying the attribute information and the statistical information.

In the exemplary embodiment, statistics on the user behavior data is performed in the database according to a preset rule, and then attribute information of the information data is obtained directly. The attribute information includes identification information and source information of the user behavior information, wherein, the identification information includes information type, information name and the like of the user behavior information, the source information includes source URL information, time and the like of the user behavior information.

The attribute information and the statistical information of behavior log data are directly displayed on the HADOOP large data platform. The statistical information includes data obtained by statistics such as the number of times a user clicking on the APP interface, the length of time to access to the APP interface, and the like. The direct display of the log information obtained by statistics on the HADOOP large data platform is clear.

In accordance with the user behavior data processing method proposed in the exemplary embodiment, attribute information of the user behavior information is obtained, then the attribute information and the statistical information are displayed. These allow the administrator of the HADOOP large data platform to view related information of the log information at a glance, so that the administrator can easily perform subsequent processing on the log information.

The present disclosure also provides a computer-readable storage medium. In the exemplary embodiment, the computer-readable storage medium stores a user behavior data processing program, wherein:

obtaining log information stored in a preset server at a fixed time, wherein, the log information includes user behavior data which is captured and sent to the preset server by client;

determining that whether row data satisfying a preset format exists in each row data of the log information, wherein, the row data is the data corresponding to each row of the log information;

setting the row data satisfying the preset format as user behavior information;

performing data statistics on the user behavior information according to a preset rule to obtain statistical information of the user behavior information.

Further, the user behavior data processing program is executed by the processor to further perform the following steps:

determining that whether the row data satisfying the preset format includes row data satisfying a preset permission;

setting the row data satisfying the preset permission as user behavior information.

Further, the user behavior data processing program is executed by the processor to further perform the following steps:

obtaining row data including a preset character or a preset character string from the row data satisfying the preset format;

performing permission validation on the first word after the preset character or the preset character string in the row data including the preset character or the preset character string, to obtain the verified row data, and setting the verified row data as the row data satisfying the preset permission.

Further, the user behavior data processing program is executed by the processor to further perform the following steps:

obtaining row data including a preset character or a preset character string from the row data satisfying the preset format;

determining that in the row data including the preset character or preset character string, whether exists row data that the second word after the preset character or the preset character string is a preset information;

setting the row data that the second word after the preset character or the preset character string is the preset information as user behavior information.

Further, the user behavior data processing program is executed by the processor to further perform the following steps:

obtaining row data including a preset character or a preset character string from the row data satisfying the preset format;

determining that in the row data including the preset character or preset character string, whether exists row data that the number of words after the preset character or the preset character string is less than a preset threshold;

setting the row data that the number of words after the preset character or the preset character string is less than the preset threshold as user behavior information.

Further, the user behavior data processing program is executed by the processor to further perform the following steps:

loading the user behavior information into a database table;

based on the database table, performing data statistics on the user behavior information according to a preset rule, to obtain statistical information of the user behavior information.

Further, the user behavior data processing program is executed by the processor to further perform the following steps:

obtaining attribute information of the user behavior information;

obtaining attribute information of the user behavior information.

It's to be clarified that the term "include", "comprise" or any other variants thereof is intended to encompass a non-exclusive inclusion, such that a process, method, device, or system including a series of elements not only includes those elements, but also includes other elements that are not explicitly listed, or elements that are inherent to such a process, method, device, or system. In the absence of more restrictions, an element defined by the phrase "including one . . . " does not exclude the existence of additional identical elements in the process, method, device, or system that includes the element.

The numbers of the embodiments according to the present disclosure are merely for description, and do not represent for the advantages and disadvantages of the embodiments.

According to the description of the above-mentioned embodiments, the skilled in the art can clearly understand that the method of embodiments above may be implemented by means of software plus a necessary general hardware platform, of course, also by means of hardware, but in many cases the former is a better implementation. Based on the understanding, the technical solution of the present disclosure can be embodied in the form of a software product in essence or in part contributing to the prior art. The software product is stored in a storage medium (such as a ROM/RAM, a magnetic disk, an optical disk) as described above, including a plurality of instructions for causing a terminal device (which may be a mobile phone, a computer, a server, an air conditioner, or a network device, and so on.) to execute the method described in various embodiments according to the present disclosure.

The foregoing description merely portrays some illustrative embodiments in accordance with the disclosure and therefore is not intended to limit the patentable scope of the disclosure. Any equivalent structure or flow transformations that are made taking advantage of the specification and accompanying drawings of the disclosure and any direct or indirect applications thereof in other related technical fields shall all fall in the scope of protection of the disclosure.

What is claimed is:

1. A user behavior data processing method, comprising:
    obtaining log information stored in a preset server at a fixed time, wherein, the log information comprises user behavior data which is captured and sent to the preset server by client;
    determining that whether row data satisfying a preset format exists in each row data of the log information, wherein, the row data is the data corresponding to each row of the log information;
    setting the row data satisfying the preset format as user behavior information;
    performing data statistics on the user behavior information according to a preset rule to obtain statistical information of the user behavior information;
    wherein the step of setting the row data satisfying the preset format as user behavior information comprises:
    determining whether the row data satisfying the preset format comprises row data satisfying a preset permission when the row data satisfying the preset format exists in each row data of the log information;
    obtaining row data comprising a preset character or a preset character string from the row data satisfying the preset permission when the row data satisfying the preset format comprises row data satisfying the preset permission;
    determining in the row data comprising the preset character or the preset character string, whether a second word after the preset character or the preset character string is a preset information;
    obtaining row data comprising the preset character or the preset character string from the row data that the second word after the preset character or the preset character string is the preset information when the second word after the preset character or the preset character string is the preset information;
    determining in the row data comprising the preset character or the preset character string, whether exists row data that number of words after the preset character or the preset character string is less than a preset threshold; and
    setting the row data that the number of words after the preset character or the preset character string is less than the preset threshold as user behavior information when row data that the number of words after the preset character or the preset character string is less than the preset threshold exists.

2. The method of claim 1, wherein the step of performing data statistics on the user behavior information according to a preset rule to obtain statistical information of the user behavior information comprises:
  loading the user behavior information into a database table;
  based on the database table, performing data statistics on the user behavior information according to a preset rule, to obtain statistical information of the user behavior information.

3. The method of claim 1, wherein, after the step of performing data statistics on the user behavior information according to a preset rule to obtain statistical information of the user behavior information, the method further comprises:
  obtaining attribute information of the user behavior information;
  displaying the attribute information and the statistical information.

4. The method of claim 3, wherein the attribute information comprises identification information and source information of the user behavior information.

5. A user behavior data processing device, comprising a memory, a processor, and a user behavior data processing program executable by the processor and stored in the memory, the user behavior data processing program when executed by the processor performing steps of the user behavior data processing method of claim 1.

6. A computer-readable storage medium storing a user behavior data processing program, the user behavior data processing program when executed by a processor performing steps of the user behavior data processing method of claim 1.

* * * * *